United States Patent [19]

Tommasini

[11] Patent Number: 5,174,071
[45] Date of Patent: Dec. 29, 1992

[54] LATHE AND GRINDER APPARATUS WITH TWO OR MORE SIDE-BY-SIDE ARRANGED MANIPULATOR-INTERFACED DUAL-SPINDLE UNITS

[75] Inventor: Luigino G. Tommasini, Bologna, Italy

[73] Assignee: Minganti S.p.A., Bologna, Italy

[21] Appl. No.: 649,705

[22] Filed: Jan. 25, 1991

[30] Foreign Application Priority Data

Apr. 27, 1990 [IT] Italy ............................. 12453 A/90

[51] Int. Cl.⁵ .............................................. B24B 47/10
[52] U.S. Cl. ........................... 51/215 AR; 51/215 HM; 51/259; 82/124; 82/125
[58] Field of Search .................. 82/70, 89, 90, 102, 82/124, 125, 126, 127; 51/259, 260, 261, 215 R, 215 AR, 215 HM, 215 E, 215 M, 215 UE, DIG. 15

[56] References Cited

U.S. PATENT DOCUMENTS 3,995,524 12/1976 Lederer ............................ 82/125
4,829,716 5/1989 Ueda et al. ................... 51/215 HM

FOREIGN PATENT DOCUMENTS 0206303 12/1983 Japan ........................... 82/125

*Primary Examiner*—Bruce M. Kisliuk
*Assistant Examiner*—John A. Marlott
*Attorney, Agent, or Firm*—Larson and Taylor

[57] ABSTRACT

The invention relates to a lathe and grinder apparatus for turning and/or grinding works and for any like machining thereof requiring spindles to be used, which comprises two dual-spindle units (T1, T2), that may be even more than two in number, arranged in a side by side parallel relation, and interfaced by means of manipulators (R1, R2, R3), which are for feeding works to the first dual-spindle unit, for delivering the machined works from the final dual-spindle unit, and for transferring the workpieces, may be in a modified direction thereof, from a dual-spindle unit to the successive one, so as to allow the various work surfaces to be machined.

4 Claims, 2 Drawing Sheets

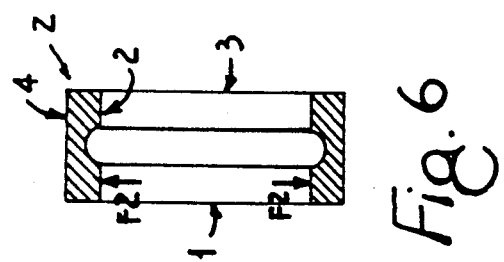
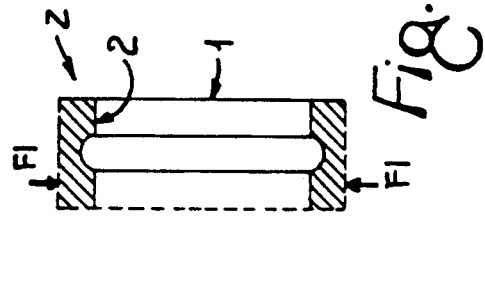
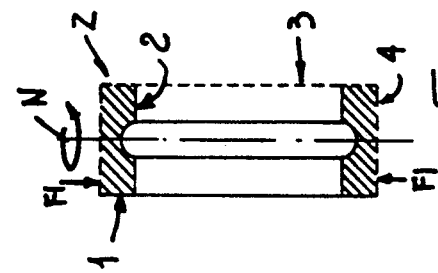
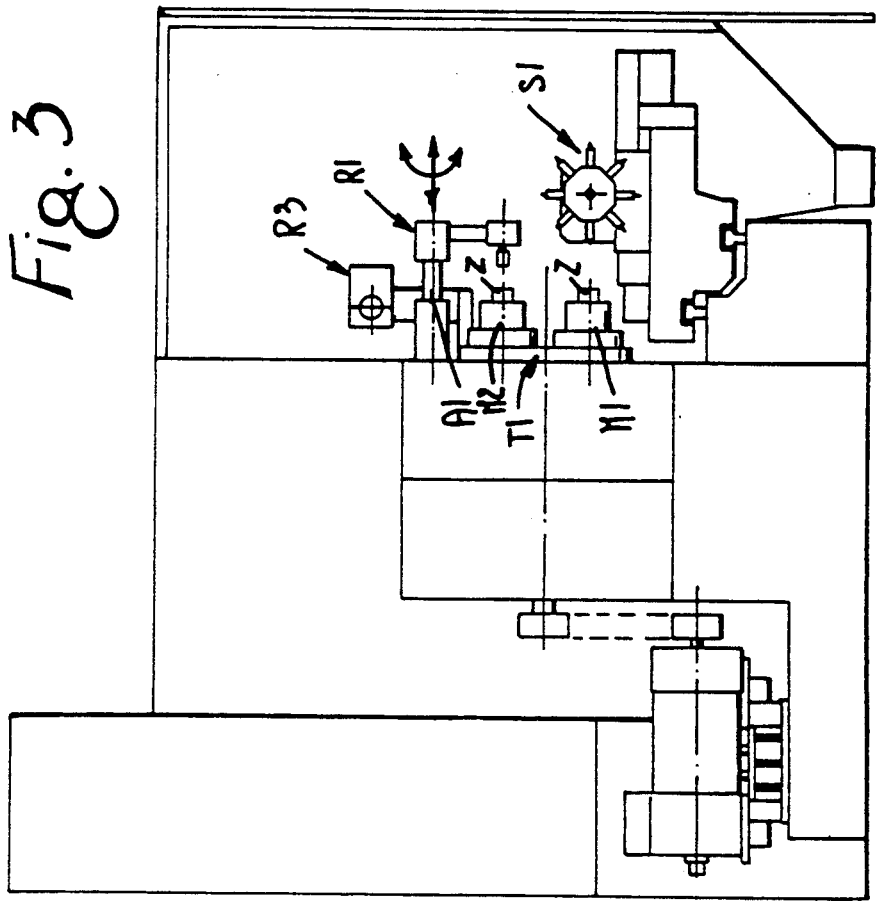

LATHE AND GRINDER APPARATUS WITH TWO OR MORE SIDE-BY-SIDE ARRANGED MANIPULATOR-INTERFACED DUAL-SPINDLE UNITS

SUMMARY OF THE INVENTION

Many turning and/or or grinding operations are presently performed by automatic multiple-spindle apparatus which are generally equipped with four, or more than four spindles arranged in a mutually parallel relation and in an angularly equispaced pattern, on a headstock-supported spindle carrier device which is cyclically indexed around its axis, to gradually position each spindle at the various work-machining stations.

Owing to the width dimension of the carrier device with the four, or more than four spindles, which is not reducible under determinate limits, and owing to the important weight of the spindle carrier device, a rather long time is required for transferring a spindle from one station to the successive one, which turns to the prejudice of the machining costs.

Occasionally, provisions should be made for allowing a workpiece to be removed from the spindle holding the same, and turned by 180°, for example, and then fitted again into this spindle or into another spindle, so that a workpiece surface other than the surface machined in the preceding steps, is brought to the successive work-machining station. Owing to the short distance between the spindles, which is due to the need of reducing as much as possible the diameter of the spindle carrier device, and when a workpiece is of a rather greater size, the aforementioned operations often become a problem, and sometimes adversely affect the work machining time.

Moreover, the present multiple-spindle apparatus have a rather complex construction, both owing to the need of limiting the diameter of the spindle carrier device, and particularly to the presence of rotary couplings as required for connection of the several spindles to the respective, fluid-pressure operated control means. The spindle carrier device presently indexes always in one direction.

The invention proposes a lathe and grinder apparatus for turning and/or grinding works, or for any like machining thereof, comprising two dual-spindle units, which may be even more than two in number, arranged in a side by side mutually parallel relation, and interfaced by means of manipulators for transferring a work from a dual-spindle unit to the successive one, and which may modify the work direction and/or positioning. The work manufacturing time is the time as required for the real and proper machining of works, and for a spindle to be transferred from one station to the successive one. The time for manufacturing a small-sized, not too complicated work, such as a bearing race, can be as a whole in the order of 5 secs., of which 3 secs. are required for the real and proper machining, and 2 secs. are required for transferring a spindle from one station to the successive one. Since a dual-spindle carrier device has a very reduced diameter, this carrier device can be indexed at a very high speed, whereby a high output can be attained.

Thanks to the 180° angular spacing between the two spindles in each dual-spindle unit, the works feeding and delivery into and from the spindles can be performed in a quite unrestrained manner and at a considerably high speed by the manipulators provided for this job.

The dual-spindle carrier devices and the manipulators are so operated as to be caused to perform a swinging movement, so that the spindles in each dual-spindle unit are connectable to the respective control means and the relative feeding means without rotary couplings being required, which are instead needed in the present multiple-spindle units.

Therefore, the operating and manufacturing costs of the novel work-machining apparatus are sensibibly reduced, also owing to the fact that this apparatus comprises two or more substantially equal dual-spindle units.

Further features of the invention, and the advantages arising therefrom will clearly appear in the following description of one preferred embodiment thereof, which is shown merely by way of an example in the figures of the two annexed sheets of drawing, in which:

BRIEF DESCRIPTION OF THE DRAWINGS

FIG. 3 is a side elevational view of this apparatus.

FIGS. 4, 5, and 6 are sectional views of a bearing race shown in the successive positions which it is caused to assume in the apparatus according to the invention.

DESCRIPTION OF THE PREFERRED EMBODIMENT

Figure 1:
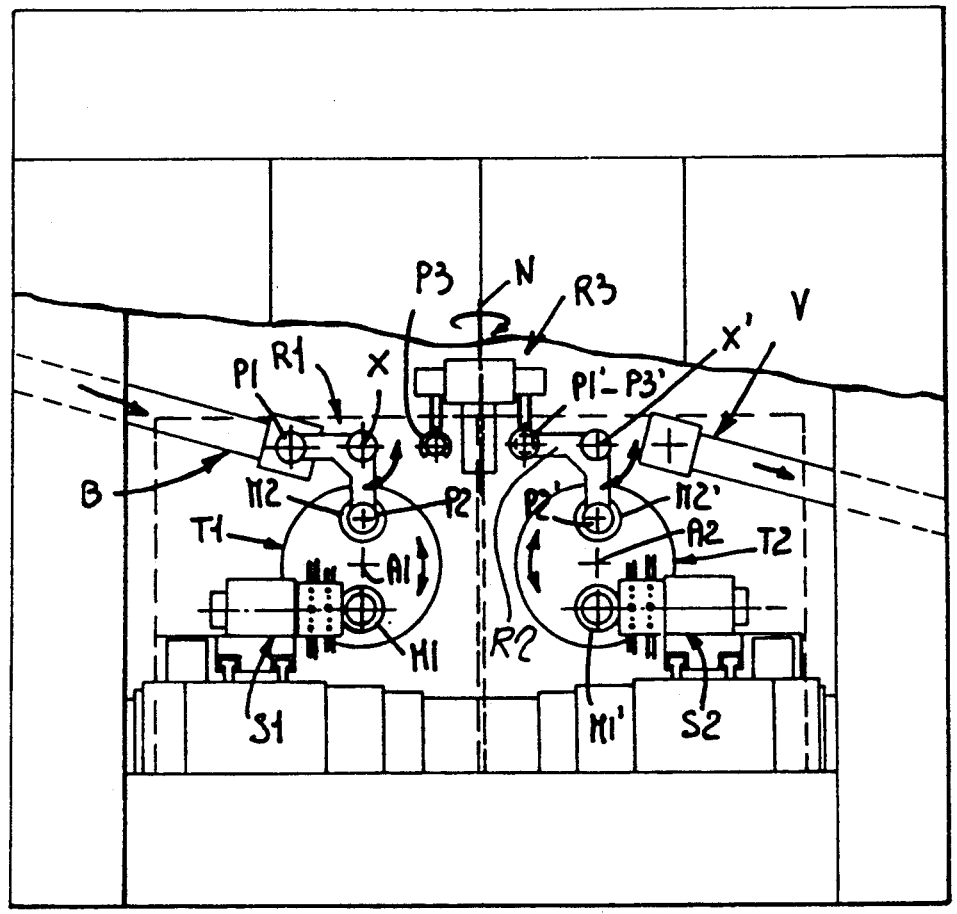
FIG. 1 is a front elevational view of the lathe and grinder apparatus according to the invention.
Figure 2:
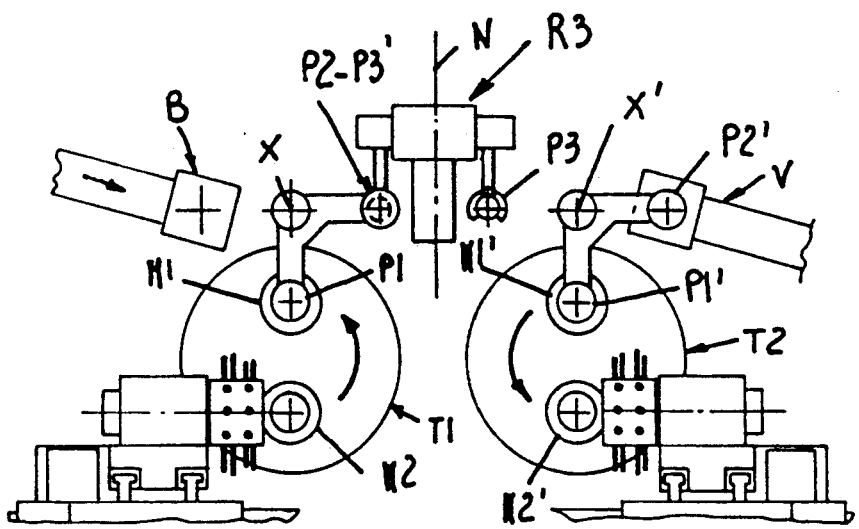
FIG. 2 is a front view showing the specific members of the apparatus according to FIG. 1, in a successive operational step.

Referring first of all to FIGS. 1 and 2, there is shown that the lathe and grinder apparatus according to the invention, comprises two equal dual-spindle units symmetrically arranged in a mutually parallel side-by-side relation, at a proper distance from each other. References T1 and T2 denote the carrier device for the dual spindles M1, M2' and M1', M2' that are angularly equispaced by 180° the ones from the others. Upon control, the spindle carrier devices T1 and T2 are caused to swing over 180° around their axis A1, A2, so that the spindles will alternate their cooperation with the respective tool-carrying slide S1, S2 located in the lower part of each dual-spindle unit, and with a work feeding and delivery station located in the upper part thereof.

As disclosed in the introductory portion of the present statement, since the spindle carrier devices T1 and T2 are not unidirectionally indexed, it is possible to have the spindles connected to the respective, stationary work-feeding and spindle-control means without the interposition of rotary couplings, with the conceivable advantages of economy and higher reliability resulting from such a condition.

The two cyclically inoperative spindles in each of the dual-spindle units, which in the shown example are upwardly positioned, are caused to cooperate with a respective manipulator R1, R2 which can be caused to take the position shown in FIG. 1 or the position shown in FIG. 2. The manipulators according to the invention, have a square-like structure, and are pivotable about their pivot point X, X' in the corner of the square, which is parallel to the axes of the spindle carrier device, the said manipulators being axially shiftable on their pivot point, whereby gripping means P1, P2, and P1', P2' are drawn near to, and away from a work to be manipulated, and the said gripping means are caused to act on the outside and/or inside diameter of this work.

Owing to the swinging movement to which the manipulators R1, R2 are subjected, also these manipulators are connectable to the respective control means without the interposition of rotary couplings, with the advantages afforded by such a condition.

In FIGS. 1 and 2 there is shown that by its gripping means P1 the manipulator R1 cyclically takes a work Z from a feeding station B, and then transfers this work to the upwardly positioned spindle in the dual-spindle unit T1. Simultaneously, the gripping means P2 of manipulator R1 takes a workpiece from the upwardly positioned spindle in this unit T1, and transfers the same to an intermediary manipulator R3, equidistantly arranged between the dual-spindle units T1 and T2, and which will be disclosed hereinafter.

The manipulator R2 is operated in phase relation with the afore-disclosed manipulator R1. By its gripping means P1', the manipulator R2 takes a work from the intermediary manipulator R3 and transfers the same to the upwardly positioned spindle in the dual-spindle unit T2, this spindle being timely delivered from a machined piece by the other gripping means P2', which transfers this machined piece into a delivery and removal station V.

The above-disclosed intermediary manipulator R3 performs the following functions.

This manipulator R3 allows to limit the operative travel of the manipulators R1, R2, so that the time is reduced, during which such a travel goes on. At the same time, it allows the dual-spindle units T1, T2 to be set at a rather great distance from each other. Finally, thanks to this manipulator, the direction of a workpiece to be transferred to the unit T2 can be modified, so that this workpiece will have its surfaces that were not machinable when it was previously positioned in unit T1, turned toward the tool-carrying slide S2.

In the shown example, the intermediary unit R3 is fitted with two gripping means P3, P3' for externally or internally gripping a work, and upon control this intermediary unit R3 is turned by 180° around a vertical axis N which is equidistant from the said gripping means.

Let us consider, for example, the machining of a work Z which here is a bearing race, as shown in FIGS. 4, 5, and 6. The race is, for example, gripped at its outside diameter—see arrows F1 in FIG. 4, by the gripping means of manipulator R1 and by the spindles M1, M2 in the first work-machining unit T1. The externally gripped work Z can have its outward end surface 1 and its inner surface 2 machined in unit T1. The work having been machined by unit T1, is then gripped at its outside diameter by the gripping means of the intermediary manipulator R3 which after having been turned by 180° around its axis N, will position this work as shown in FIG. 5. The work Z being externally held by the manipulator R3, is then gripped at its outside diameter by the gripping means of manipulator R2. The work is finally held at its inside diameter by the spindles of unit T2, as shown by arrows F2 in FIG. 6, so that its opposite end surface 3 and its outer surface 4 can be machined.

While the machining of a work moved into cooperation with the tool-carrying slides S1, S2 is being performed, the manipulators R1, R2 are delivering the machined pieces from the upwardly positioned spindles, and at the same time are taking a fresh work from the station B and a work from the intermediary manipulator R3 (FIG. 1), whereupon in phase relation with the spindle carrier devices T1, T2 being indexed by 180°, the manipulators R1, R2 are swung over 90°, so that the machined pieces are transferred from T1 to R3 and from T2 to the delivery V (FIG. 2). In phase succession, while the intermediary manipulator R3 is being turned by 180°, the manipulators R1, R2 are returned into their rest position shown in FIG. 1, for a new operative cycle to be repeated.

The succession of the machining steps is such that a finished piece is caused to issue from the delivery station V at the same rate as required for a work to be machined in one of the two dual-spindle units, and for this work to be turned by 180° by its dual-spindle unit.

It is understood that numerous changes and modifications may be brought to the invention, the more so in construction, which may particularly relate to the following features. Instead of the one intermediary manipulator R3, more than one intermediary manipulator may be provided. Otherwise, the intermediary manipulator R3 may be eliminated, and the two dual-spindle units may be so arranged that the manipulator R1 will directly transfer the works to the manipulator R2. When the direction of the works is not to be changed, the manipulators R1, R2 may be of a simple type, like that of the disclosed manipulators R1, R2. Conversely, when the direction of the works is to be changed, at least one of the two manipulators R1, R2 may be fitted with a gripping means which is turnable or swingable around an axis being perpendicular to the pivot points X, X' about which the manipulators R1, R2 are caused to swing, the whole arrangement being such as to be conceivable and easily practiced by those skilled in the art.

I claim:

1. A lathe and grinder apparatus for machining a workpiece, said apparatus comprising:

at least first and second dual-spindle units arranged side-by-side and each including a pair of spindles and a spindle carrier device having a longitudinal axis and a tool-carrying slide, the longitudinal axes of the spindle carrier devices being arranged in a mutually parallel relation, the said dual-spindle units being equipped with means which, in timed relation, causes the said spindle carrier devices to be indexed by 180°, whereby one spindle of each of the pairs of spindles is brought in turn into cooperation with a respective one of the tool-carrying slides of the said dual-spindle units, and the other spindle of each of the pairs of spindles is moved into a station for a workpiece to be fed and delivered, at least one manipulator for each dual-spindle unit, which is caused, in use, to swing about a respective pivot axis extending parallel to the longitudinal axis of the associated dual-spindle carrier device, each said manipulator being each axially shiftable on the pivot axis thereof, and being each fitted with two gripping means for gripping a workpiece, and for acting on inoperative spindles that are not cooperating with the tool-carrying slides so as to deliver a workpiece from the inoperative spindle of the first dual-spindle unit and so as to fit into this spindle a new workpiece taken from a feeding station, and so as to deliver a machined workpiece from the inoperative spindle of the second dual spindle unit, and so as to fit into this spindle a partly machined workpiece supplied from the first dual-spindle unit.

2. The apparatus according to claim 1, in which the manipulators for the first and second dual-spindle units directly cooperate with each other so as to transfer a workpiece from one dual-spindle unit to a successive dual-spindle unit.

3. The apparatus according to claim 2, in which one of the gripping means of at least one of the two manipulators for the dual-spindle units is caused, in use, to act on a workpiece during the transfer thereof from said one dual-spindle unit to said successive dual-spindle unit, and said one gripping means pivots around an axis in such a manner that this workpiece will be transferred to a final dual-spindle unit in a different direction.

4. The apparatus according to claim 1, wherein at least one intermediary manipulator is interposed between the manipulators for the dual-spindle units, said at least one intermediary manipulator including gripping means for gripping a workpiece, and which is caused, in use, to pivot around an axis orthogonal to the axes of the dual-spindle units, so as to transfer a workpiece to a final manipulator in a different direction.

* * * * *